(12) United States Patent
Chishima

(10) Patent No.: US 7,856,180 B2
(45) Date of Patent: Dec. 21, 2010

(54) CAMERA DEVICE

(75) Inventor: Makoto Chishima, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 604 days.

(21) Appl. No.: 11/719,387

(22) PCT Filed: Dec. 1, 2005

(86) PCT No.: PCT/JP2005/022094
§ 371 (c)(1),
(2), (4) Date: May 15, 2007

(87) PCT Pub. No.: WO2006/062027
PCT Pub. Date: Jun. 15, 2006

(65) Prior Publication Data
US 2009/0148149 A1    Jun. 11, 2009

(30) Foreign Application Priority Data
Dec. 8, 2004    (JP) ............................. 2004-356068

(51) Int. Cl.
*G03B 35/00* (2006.01)

(52) U.S. Cl. ...................... 396/324; 455/575.4; 348/36; 396/322; 396/326; 396/333

(58) Field of Classification Search .................. 396/20, 396/322, 324, 326, 333; 348/49, 50, 36
See application file for complete search history.

(56) References Cited

U.S. PATENT DOCUMENTS 3,269,291 A * 8/1966 Bernier ......................... 396/20
5,337,101 A * 8/1994 Lin .............................. 353/7
5,699,108 A * 12/1997 Katayama et al. ........... 348/47

(Continued)

FOREIGN PATENT DOCUMENTS

JP    07-053071    12/1995

(Continued)

OTHER PUBLICATIONS

Machine translation of jp 2003-051872.*

(Continued)

*Primary Examiner*—Clayton E Laballe
*Assistant Examiner*—Linda B Smith
(74) *Attorney, Agent, or Firm*—DLA Piper LLP (US)

(57) ABSTRACT

Stereo photographs and panoramic photographs can be taken separately without enabling cameras to rotate relative to a casing in which the cameras are placed. A camera device capable of selectively photographing panoramic images and stereo images includes a casing (1D) fixed with a photographic lens (11D), and a casing (1U) that is fixed with a photographic lens (11U) and that moves relative to the casing (1D) while facing the casing (1D); wherein in cases in which the photographic lenses (11D) and (11U) are disposed in open, mutually spaced apart positions by relative movement of the case (1U), the optical axes of the photographic lenses (11D) and (11U) are placed in positions capable of photographing stereo images; and in cases in which the photographic lenses (11D) and (11U) are disposed in closed, mutually proximal positions by relative movement of the case (1U), the optical axes of the photographic lenses (11D) and (11U) are placed in positions capable of photographing panoramic images.

4 Claims, 9 Drawing Sheets

U.S. PATENT DOCUMENTS

| | | | |
|---|---|---|---|
| 5,937,212 A * | 8/1999 | Kurahashi et al. | 396/20 |
| 6,512,892 B1 * | 1/2003 | Montgomery et al. | 396/326 |
| 7,397,511 B2 * | 7/2008 | Ezawa | 348/373 |
| 7,599,616 B2 * | 10/2009 | Uchiumi et al. | 396/324 |
| 2003/0040346 A1 * | 2/2003 | Fukuda et al. | 455/575 |

FOREIGN PATENT DOCUMENTS

| | | |
|---|---|---|
| JP | 10-145657 | 5/1998 |
| JP | 2000-036968 | 2/2000 |
| JP | 2003-051872 | 2/2003 |
| JP | 2007206617 A * | 8/2007 |

OTHER PUBLICATIONS

Machine translation of JP2007-206617A.*

* cited by examiner (a) NORMAL MODE (b) PANORAMA MODE

IMAGE IN NORMAL MODE

CAMERA DEVICE

TECHNICAL FIELD

The present invention relates to a camera device, and particularly relates to a technique for taking both stereo photographs and panoramic photographs with a camera fixed to a portable phone device.

BACKGROUND ART

Portable phone devices equipped with cameras are being sold by telecommunications carriers and are becoming popular. Various methods for installing a camera in such a portable phone device have been proposed in the past. Specifically, these proposals include, e.g., a method wherein an internal camera and an external camera are installed to allow the photographer to photograph their own face while looking at the display of the portable phone; and, as disclosed in Patent Document 1, a method wherein two cameras are installed to make it possible to take both stereo photographs and panoramic photographs.

In the portable phone device disclosed in Patent Document 1, a folding portable phone has cameras installed at the ends of two casings that are rotatably connected. The cameras are capable of rotating relative to the casings in which the cameras are installed, whereby the optical axis directions of the two cameras can be varied relative to each other. Varying the optical axis directions of the two cameras relative to each other makes it possible to separately take stereo photographs and panoramic photographs with the two cameras.

[Patent Document 1] Japanese Unexamined Patent Application Publication No. 2003-51872

DISCLOSURE OF THE INVENTION

Problems to be Solved by the Invention

However, in the prior art disclosed in Patent Document 1, the cameras must be capable of rotating relative to the casings in which the cameras are installed. Therefore, hinges for rotating the cameras must be provided, and problems arise in terms of reducing the size of the camera device, which is a portable phone.

The present invention was designed in view of these problems, and an object thereof is to provide a camera device that is capable of separately taking stereo photographs and panoramic photographs without rotating cameras relative to casings in which the cameras are placed.

Means for Solving the Problem

A camera device according to one aspect of the present invention for resolving these problems is a camera device capable of selectively photographing panoramic images or stereo images, including a first casing fixed with a first photographic lens, and a second casing that is fixed with a second photographic lens and that moves relative to the first casing while facing the first casing; wherein in cases in which the first and second photographic lenses are disposed in open, mutually spaced apart positions by relative movement of the second casing, the optical axes of the first and second photographic lenses are placed in positions capable of photographing stereo images; and in cases in which the first and second photographic lenses are disposed in closed, mutually proximal positions by relative movement of the second case, the optical axes of the first and second photographic lenses are placed in positions capable of photographing panoramic images.

Thus, it is possible to separately take stereo photographs and panoramic photographs without enabling the photographic lenses to rotate relative to the casings in which the cameras are installed. Specifically, since the optical axes of the photographic lenses do not move relative to the casings, and stereo photographs and panoramic photographs can be taken separately merely by opening and closing the casings, stereo photographs and panoramic photographs can easily be taken separately by opening and closing the casings, without providing a mechanism for moving the optical axes of the photographic lenses relative to the casings.

In this camera device, the included angle formed by the optical axes of the first and second photographic lenses in the closed positions may be substantially equal to the included angle formed by the normal lines of the first and second casings in the open positions. Thus, the distance between the photographic lenses can be set to a suitable distance for both stereo photography and panoramic photography.

In this camera device, the second casing may be configured so that the area that moves relative to the first casing does not overlap the area of the angle of view determined by the optical axis of the first photographic lens.

This camera device may be designed so that in cases in which the first and second photographic lenses are disposed in the open positions, stereo images are created based on images photographed using both the first and second photographic lenses; and in cases in which the first and second photographic lenses are disposed in the closed positions, panoramic images are created based on images photographed using both the first and second photographic lenses. Thus, stereo photographs and panoramic photographs can be suitably taken because the created images can be changed according to the state of the camera device.

BEST MODE FOR CARRYING OUT THE INVENTION

Embodiments of the present invention will now be described with reference to the drawings.

Figure 1:
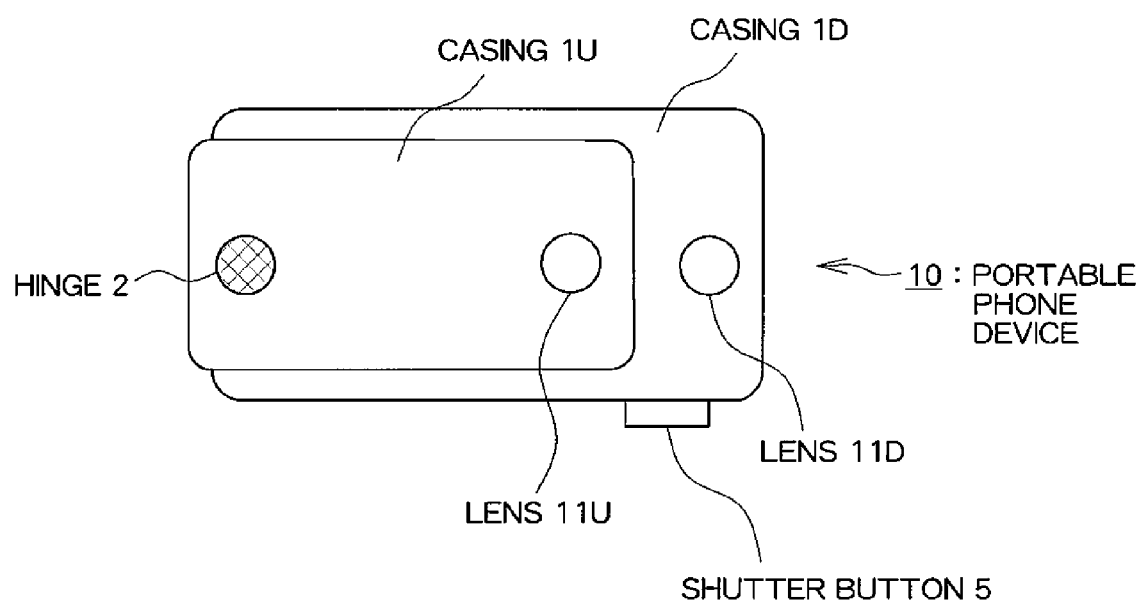
FIG. 1 is a top view of a closed portable phone device according to an embodiment of the present invention.
Figure 2:
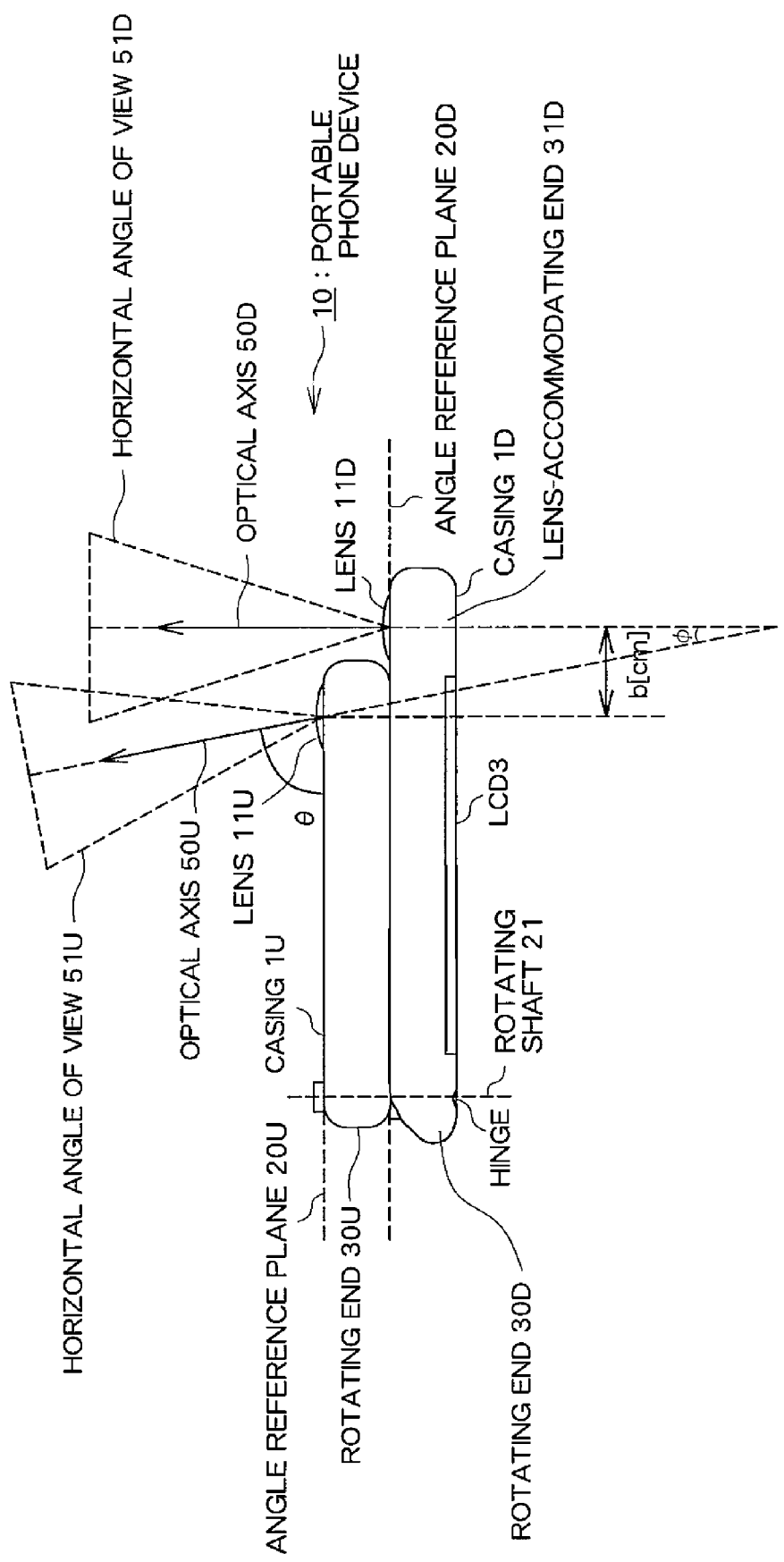
FIG. 2 is a right side view of a closed portable phone device according to an embodiment of the present invention.
Figure 3:
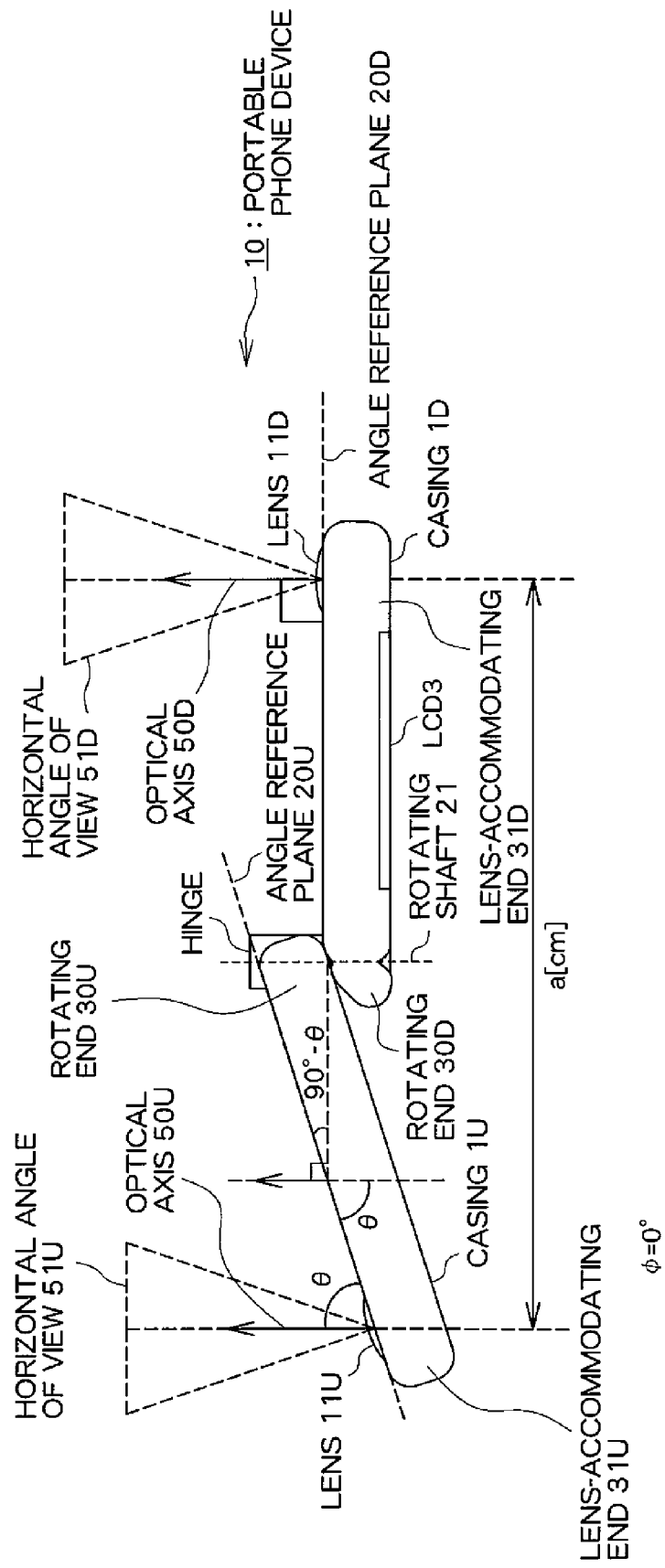
FIG. 3 is a right side view of an open portable phone device according to an embodiment of the present invention.

FIG. 1 is a plan view of a closed portable phone device 10 used as a camera device according to the present embodiment. FIG. 2 is a right side view of the closed portable phone device 10 (in the closed position) according to the present embodiment. FIG. 3 is a right side view of the open portable phone device 10 (in the open position) according to the present embodiment, wherein a casing 1U is rotated and inclined via a hinge 2.

The portable phone device 10 includes a casing 1D and a casing 1U, as shown in FIG. 1. The casings are both substantially shaped as cuboids having two substantially parallel surfaces. One end of the casing 1D and one end of the casing 1U are connected by the hinge 2, and this hinge 2 allows the casing 1D and casing 1U to move relative to each other while in a mutually facing arrangement. These ends of the casing 1D and casing 1U are hereinafter referred to, respectively, as the rotating end 30D of the casing 1D and the rotating end 30U of the casing 1U.

When the portable phone device 10 is closed as shown in FIG. 2, the casing 1U and the casing 1D both have surfaces (closed surfaces) that face each other. The casing 1D has an open surface on the opposite side of the closed surface, as shown in FIG. 2 or 3, and an LCD 3 (liquid crystal display) is provided on this open surface. The casing 1U also has an open surface on the opposite side of the closed surface. Though not shown in the diagram, the casing 1U has, on the closed surface, dial buttons and other pushbuttons that are input devices for the portable phone device 10.

A lens 11D, which is a photographic lens used with the camera, is fixed on the closed surface at the other end of the casing 1D, and a lens 11U, which is also a photographic lens, is fixed on the open surface at the other end of the casing 1U. The other end of the casing 1D and the other end of the casing 1U are hereinafter referred to as the lens-accommodating end 31D of the casing 1D and the lens-accommodating end 31U of the casing 1U, respectively. Furthermore, a shutter button 5 is provided on the side surface of the casing 1D.

The angle reference plane such as the one shown in FIG. 2 or 3 for the casing 1D and casing 1U will now be defined. An angle reference plane is a plane whose position does not vary relative to the casing, and is defined for each casing. The closed surface of the casing 1D is defined as an angle reference plane 20D, and the open surface of the casing 1U is defined as an angle reference plane 20U.

Next, the hinge 2 will be described. The hinge 2 has a rotating shaft 21 placed so that the casing 1U can rotate relative to the casing 1D. The rotating shaft 21 is placed in the closed surface of the casing 1D at the rotating end 30D so that the vertical direction (thickness direction of the casing 1D) is the axial direction. Therefore, the closed surface of the casing 1U can be rotated while in a facing arrangement with the casing 1D by rotating the casing 1U around the rotating shaft 21.

The casing 1U is also configured to be capable of sliding in the direction of the rotating shaft in relation to the hinge 2. Therefore, the casing 1U can move in relation to the casing 1D, towards and away from the closed surface in the vertical direction. As a result of this arrangement, the casing 1U can be made to slide floating somewhat when the casing 1U is rotated around the rotating shaft 21.

Furthermore, the hinge 2 includes an elastic member, which is, e.g., a bending spring. The elastic force of this elastic member allows the casing 1U to swing around the periphery of the rotating shaft 21, and causes the casing 1U to push against the casing 1D. In this arrangement, certain play is provided by causing the casing 1U to swing during rotation, and the casing 1U presses against the casing 1D with a constant force when the portable phone device 10 is closed or open. The result of this pressure is that the angle formed by the angle reference plane 20D and the angle reference plane 20U is kept at a specific value when the portable phone device 10 is both closed or open.

Specifically, when the portable phone device 10 is closed as shown in FIG. 2, the angle formed by the angle reference plane 20U and the angle reference plane 20D has the specific value of 0°. On the other hand, when the portable phone device is open as shown in FIG. 3, the angle formed by the angle reference plane 20U and the angle reference plane 20D has a specific value of 90°+θ (θ≠90°, i.e., the angle is not 180°). Another way of expressing this angle is 180°−(90°+θ)=90°−θ. Thus, in the present embodiment, the angle formed by the angle reference plane 20U and the angle reference plane 20D has a difference equal to a specific angle 90°−θ (θ≠90°) between the closed state and open state of the portable phone device 10. In other words, the casing 1U can be inclined in relation to the casing 1D.

Next, the lens 11D and the lens 11U will be described. The lens 11D is a camera lens and has an optical axis 50D that is the optical axis of the camera. A horizontal angle of view 51D is defined in the periphery of the optical axis 50D. The camera can photograph objects within the photographing range shown by the horizontal angle of view 51D. The same applies to the lens 11U, which has an optical axis 50U and for which a horizontal angle of view 51U is defined.

Since the lens 11D is fixed in the casing 1D as described above, the optical axis 50D is always pointed in the same direction in relation to the casing 1D. This direction can be defined by the angle between the angle reference plane 20D and the optical axis 50D. In the present embodiment, this angle is 90°, as shown in FIG. 2 or 3.

Since the lens 11U is also fixed in the casing 1U, the optical axis 50U is always pointed in the same direction in relation to the casing 1U. This direction is defined by the angle between the angle reference plane 20U and the optical axis 50U. In the present embodiment, this angle is θ as shown in FIG. 2 or 3.

In the arrangement described above, the optical axis 50D and the optical axis 50U are fixed at specific angles (optical axis/reference plane angles) in relation to the angle reference plane 20D and the angle reference plane 20U, respectively. When the portable phone device 10 is closed, the angle (reference plane/reference plane angle) formed by the angle reference plane 20D and the angle reference plane 20U is equal to 0°, and the angle (optical axis/optical axis angle) ø formed by the optical axis 50D and the optical axis 50U is therefore equal to 90°−θ. When the portable phone device 10 is open, the reference plane/reference plane angle is equal to 90°−θ, and the optical axis/optical axis angle ø is therefore equal to 0°. Specifically, the optical axis 50D and the optical axis 50U point in the same direction.

Thus, the reference plane/reference plane angle differs between the open and closed state, and the optical axis/reference plane angle is fixed so as to be invariable, whereby the optical axis/optical axis angle is 90°−θ (θ≠90°) when the portable phone device 10 is open, and the optical axis/optical axis angle is 0° when the portable phone device 10 is open. In other words, the optical axis/optical axis angle differs by an amount corresponding to the mutual difference 90°−θ of the reference plane/reference plane angle. More specifically, the reference plane/reference plane angle (equivalent to the angle formed by the normal lines of the casings) when the portable phone device 10 is open and the optical axis/optical axis angle when the portable phone device 10 is closed are substantially equal.

The casing 1U is also configured to be shorter in the longitudinal direction than the casing 1D. The casing 1U is thereby configured so that even when the portable phone device 10 is closed, the area of relative movement of the casing 1U with respect to the casing 1D is not superposed within the photographing range (angle of view area) indicated by the horizontal angle of view 51D, as shown in FIG. 2. As described above, the rotating end 30D of the casing 1D and the rotating end 30U of the casing 1U are connected by the hinge 2, and the lens 11D and lens 11U are placed at the lens-accommodating end 31D of the casing 1D and the lens-accommodating end 31U of the casing 1U, respectively. Therefore, when the distance a [cm] between the lens 11D and the lens 11U in the open state of the portable phone device 10 is compared with the distance b [cm] between the lens 11D and the lens 11U in the closed state of the portable phone device 10, a is greater than b. Specifically, the lens 11D is at a distance from the lens 11U when the portable phone device 10 is open, and the lens 11D and lens 11U are in proximity to each other when the portable phone device 10 is closed. The specific values of a and b vary according to the lengths of the casing 1D and casing 1U, the position of the rotating shaft 21 relative to the casing 1D and casing 1U, the position of the lens 11D relative to the casing 1D, and the position of the lens 11U relative to the casing 1U.

The following is a description of the operation of the portable phone device 10 having the configuration described above.

Figure 4:
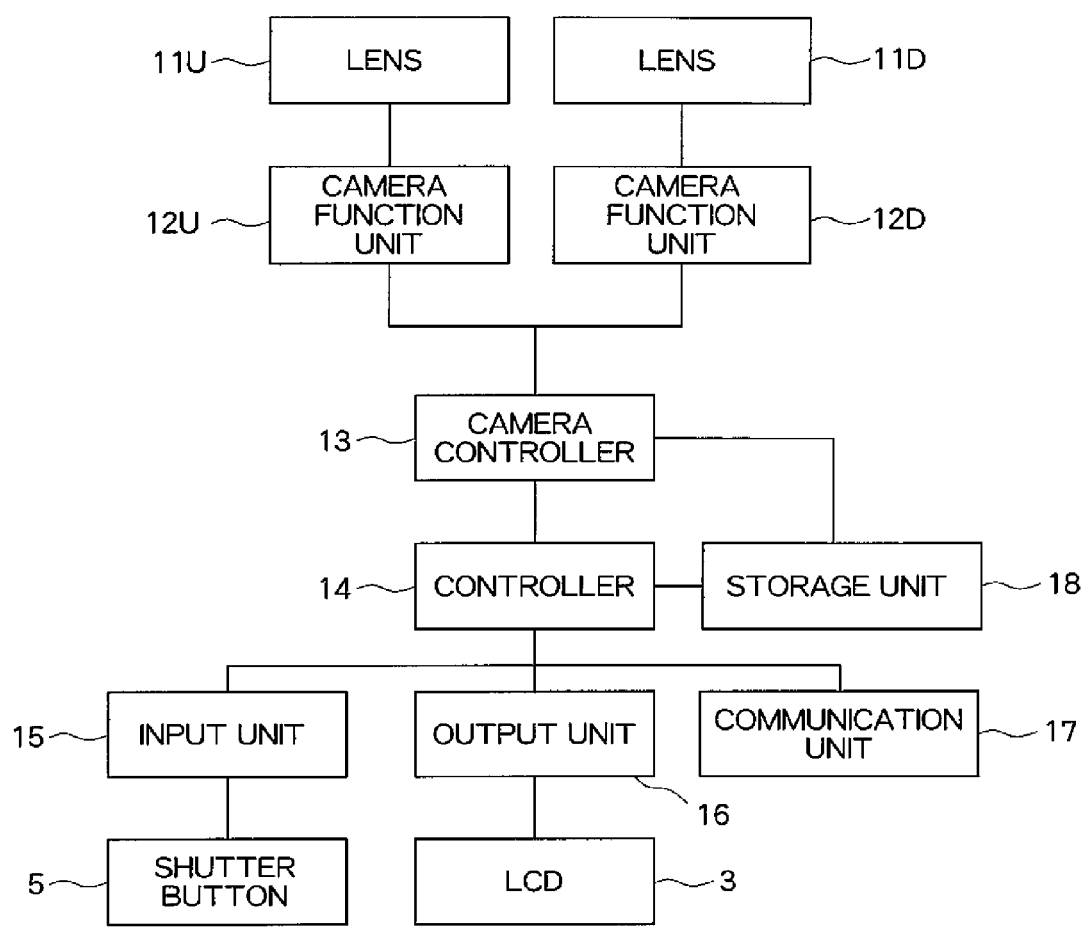
FIG. 4 is a function block diagram of the portable phone device according to an embodiment of the present invention.

FIG. 4 is a function block diagram of the portable phone device 10. As shown in this diagram, the portable phone device 10 includes a camera function unit 12D, a camera function unit 12U, a camera controller 13, a controller 14, an input unit 15, an output unit 16, a communication unit 17, and a storage unit 18.

The camera function unit 12D and the camera function unit 12U are connected to the lens 11D and lens 11U, respectively. The input unit 15 is connected to the shutter button 5, and the output unit 16 is connected to the LCD 3.

The camera function unit 12D and camera function unit 12U include camera functions whereby photographs can be taken using the lens 11D and lens 11U, respectively, as photographic lenses. Either auto-focusing or panning may be used as the focusing mechanism in the camera functions.

The camera controller 13 controls the camera function unit 12D and the camera function unit 12U, receives the images (still images and videos) photographed by the camera function unit 12D and camera function unit 12U, and performs the image process described later. The camera controller outputs the processed images to the controller 14. The camera controller also controls the power source so as to supply and terminate power to the camera function unit 12D and camera function unit 12U.

The controller 14, input unit 15, output unit 16, and communication unit 17 perform various processes that allow the portable phone device 10 to function as a portable phone. Specifically, the communication unit 17 exchanges signals with a base station apparatus of a mobile communications system. The input unit 15 provides an interface process for the input signals sent to the controller 14. In this process, signals produced by the pressing of the dial buttons (not shown) by the user are outputted to the controller 14, sounds inputted from a microphone (not shown) are outputted as encoded signals to the controller 14, data signals inputted from a PC interface (not shown) are outputted to the controller 14, and shutter depression signals inputted from the shutter button 5 are outputted to the controller 14. The output unit 16 provides an interface for the output signals from the controller 14. In this process, specific image signals to the LCD 3 are outputted according to instruction signals from the controller 14, sound signals are outputted to a speaker (not shown) according to instruction signals from the controller 14, and data signals are outputted to a PC interface (not shown) according to instruction signals from the controller 14. The controller 14 then controls the aforementioned function units, performs a specific process for the signals inputted from the aforementioned function units, and processes signals outputted to other function units.

In addition to functioning as working memory for the controller 14 and camera controller 13, the storage unit 18 also stores images, mail, phone numbers, and other such various data stored in the portable phone device 10. The storage unit 18 is configured to be readable and writeable by the controller 14 and camera controller 13.

The input unit 15 is configured to be capable of acquiring information that indicates whether the portable phone device 10 is open, closed, or neither. Specifically, a specific sensor can be provided in the hinge 2. This sensor detects the state of the portable phone device 10 and outputs the state as a state signal to the input unit 15.

The following is a description of the photographing method in the present embodiment.

The photographing process is performed while selectively switching between normal photography mode, stereo photography mode, and panoramic photography mode. These photography modes are described hereinbelow.

In normal photography mode, photographs are taken with one camera. Therefore, photographs are taken using only one of either the camera function unit 12U or the camera function unit 12D. In this example, photographs are taken using the camera function unit 12D.

First, the user selects a camera mode in a menu screen (not shown) displayed on the LCD 3 of the portable phone device 10. This camera mode is either a mode to "take photographs with one camera" or a mode to "take photographs with two cameras." When the user wishes to take photographs in normal photography mode, the user selects the mode to "take photographs with one camera." The selected camera mode is then stored in the storage unit 18. When photographs are actually taken, the user selects the option to take pictures with a camera in the menu screen, whereupon the controller 14 checks the camera mode stored in the storage unit 18. In cases in which the camera mode is the mode to "take photographs with one camera," the controller determines that normal photography mode is in effect. The controller 14 then presents the camera controller 13 with a mode notification signal stating that photographs will be taken with a camera in normal photography mode; the camera controller 13 selects, in accordance with the mode notification signal, the camera function unit that will be supplied with power; and power is supplied to the selected camera function unit. Only one of the camera function unit 12D and camera function unit 12U is selected in normal photography mode. In this description, the camera function unit 12D is selected. The camera controller 13 presents the controller 14 with images that are the photographic results outputted from the camera function unit 12D. Having received these images, the controller 14 displays the images photographed by the camera function unit 12D on the LCD 3 in real time. The LCD 3 functions as a finder in this manner.

When the shutter button 5 is pressed, a shutter depression signal indicating this action is outputted to the camera controller 13 via the input unit 15 and the controller 14. The camera controller 13 thereupon controls the camera function unit 12D to take a photograph. The picture representing the image photographed at this time forms an image of objects within the range of the horizontal angle of view 51D.

The camera controller 13 outputs the photographed image to the controller 14, the controller 14 temporarily stores the image in the storage unit 18 and outputs the image to the output unit 16, and the output unit 16 displays the image on the LCD 3. The user can then select to store the photographed image in the storage unit 18, to attach and send the photographed image with an e-mail, or to perform another action.

Stereo photography mode will now be described. In stereo photography mode, stereo photographs are taken using two cameras.

The procedure of stereo photography is described herein. People can see objects three-dimensionally by viewing objects with two eyes. People can then experience two images as a three-dimensional image by viewing two images that are separated to some extent (about the distance between human eyes) and that are photographed simultaneously. With stereo photography, this principle is used to photograph images that can be viewed three-dimensionally. Specifically, images are photographed simultaneously with two cameras that have optical axes pointed in the same direction and that are separated by a certain distance. Thus, because of the distance between the two cameras, the two photographed images form different images corresponding to this distance. A person can then experience the two images as one three-dimensional image by viewing the two photographed images with one eye each.

The most suitable image for a stereo display is an image of a subject separated from the photographer by a distance of approximately 50 times the distance between the two cameras (the baseline length, also referred to as the stereo base). In the present embodiment, the baseline length is a [cm], and an optimal stereo effect can be achieved when a subject is photographed at a distance of about 50×a [cm].

In the stereo photography mode according to the present embodiment, photographs are taken using both the camera function unit 12U and the camera function unit 12D.

First, the user opens the portable phone device 10. The sensor described above senses that the portable phone device 10 is open, and then notifies the input unit 15 with a state signal, which is also outputted to the controller 14. The controller 14 stores, as state information in the storage unit 18, the state notified by means of the state signal.

The user selects the camera mode in the menu screen (not shown) displayed on the LCD 3 of the portable phone device 10. The user selects the mode to "take photographs with two cameras" when the user wishes to take photographs in stereo photography mode. The selected camera mode is then stored in the storage unit 18. When photographs are actually taken, the user selects the option to take pictures with the cameras in the menu screen, whereupon the controller 14 checks the camera mode stored in the storage unit 18. In cases in which the camera mode is the mode to "take photographs with two cameras," the controller checks the state information stored in the storage unit 18. If the state information indicates that the phone device is open, the controller determines that stereo photography mode is in effect, and presents the camera controller 13 with a mode notification signal stating that photographs will be taken with the cameras in stereo photography mode. When the mode notification signal is inputted, the camera controller 13 selects, in accordance with the mode notification signal, the camera function unit that will be supplied with power; and power is supplied to the selected camera function unit. Both the camera function unit 12D and camera function unit 12U are selected in stereo photography mode, and the camera controller 13 supplies power to the camera function unit 12D and the camera function unit 12U. The camera controller 13 presents the controller 14 with images that are the photographic results outputted from the camera function unit 12D. Having received these images, the controller 14 displays the images photographed by the camera function unit 12D on the LCD 3 in real time. The LCD 3 functions as a finder in this manner.

The display of the LCD 3 at this time may be a three-dimensional display. In this case, the camera controller 13 presents the controller 14 with images that are the photographic results outputted both from the camera function unit 12D and from the camera function unit 12U. Having received these images, the controller 14 displays a three-dimensional image in real time, using parallax barriers or another such 3D display function, which will be described later.

When the shutter button 5 is pressed, a shutter depression signal indicating this action is outputted to the camera controller 13 via the input unit 15 and the controller 14. The camera controller 13 thereupon controls the camera function unit 12D and the camera function unit 12U to simultaneously take photographs. Thus, the camera controller 13 functions as a simultaneous photography device for capturing two images by causing the lens 11D and the lens 11U, which are photographic lenses, to simultaneously take photographs. The two pictures representing the images that are photographed at this time form images of objects within the ranges of the horizontal angle of view 51D and the horizontal angle of view 51U shown in FIG. 3. At this time, when the portable phone device 10 is open, the optical axis 50D and the optical axis 50U are pointed in the same direction as described above. A distance of a [cm] separates the optical axis 50D and the optical axis 50U, and the distance expressed by a [cm] is substantially equivalent to the distance between a human's eyes. Therefore, the two pictures photographed by the camera function unit 12D and the camera function unit 12U constitute a stereo image. In other words, when the portable phone device 10 is open, the optical axis 50D and the optical axis 50U point in the same direction, and the optical axis 50D and optical axis 50U are also spaced apart, whereby stereo images can be photographed.

The camera controller 13 then outputs the photographed stereo image to the controller 14, the controller 14 temporarily stores the stereo image in the storage unit 18 and outputs the image to the output unit 16, and the output unit 16 displays the stereo image on the LCD 3.

The LCD 3 may be a 3D display-enabled liquid crystal having a parallax barrier function, for example. In this case, the controller 14 may be designed to control the LCD 3 via the output unit 16, so that the two pictures representing the photographed stereo image are displayed three-dimensionally by the parallax barrier function provided to the LCD 3.

The user can then select to store the photographed stereo image in the storage unit 18, to attach and send the photographed stereo image with an e-mail, or to perform another action.

Panoramic photography mode will now be described. In panoramic photography mode, panoramic photographs are taken using two cameras.

The procedure of panoramic photography mode is described herein. The term "panoramic photography" refers to taking photographs in a panoramic view (360°) while turning the camera horizontally over a wider range than for an image that can be photographed without moving one camera. Panoramic photographs can be taken by turning the camera or by combining images photographed in different directions to form one image.

In panoramic photography mode according to the present embodiment, panoramic photographs are taken by using both the camera function unit 12U and the camera function unit 12D, and combining the images photographed with the camera function units to form one image.

First, the user closes the portable phone device 10. The sensor described above senses that the portable phone device 10 is closed, and then notifies the input unit 15 with a state signal, which is also outputted to the controller 14. The controller 14 stores, as state information in the storage unit 18, the state notified by means of the state signal.

The user selects the camera mode in the menu screen (not shown) displayed on the LCD 3 of the portable phone device 10. The user selects the mode to "take photographs with two cameras" when the user wishes to take photographs in panoramic photography mode. The selected camera mode is then stored in the storage unit 18. When photographs are actually taken, the user selects the option to take pictures with the cameras in the menu screen, whereupon the controller 14 checks the camera mode stored in the storage unit 18. In cases in which the camera mode is the mode to "take photographs with two cameras," the controller checks the state information stored in the storage unit 18. If the state information indicates that the phone device is closed, the controller determines that panoramic photography mode is in effect, and presents the camera controller 13 with a mode notification signal stating that photographs will be taken with the cameras in panoramic photography mode. When the mode notification signal is inputted, the camera controller 13 selects, in accordance with the mode notification signal, the camera function unit that will be supplied with power; and power is supplied to the selected camera function unit. Both the camera function unit 12D and camera function unit 12U are selected in panoramic photography mode, and the camera controller 13 supplies power to the camera function unit 12D and the camera function unit 12U. The camera controller 13 presents the controller 14 with images that are the photographic results outputted from the camera function unit 12D. Having received these images, the controller 14 displays the images photographed by the camera function unit 12D on the LCD 3 in real time. The LCD 3 functions as a finder in this manner.

The display on the LCD 3 at this time may be a panoramic display. In this case, the camera controller 13 creates a panoramic image by combining the images that are the photographic results outputted both from the camera function unit 12D and from the camera function unit 12U, and outputs the resulting images to the controller 14. Having received these panoramic images, the controller 14 displays the panoramic images in real time. The display at this time is as shown in FIG. 5(b), which is described later.

When the shutter button 5 is pressed, a shutter depression signal indicating this action is outputted to the camera controller 13 via the input unit 15 and the controller 14. The camera controller 13 thereupon controls the camera function unit 12D and the camera function unit 12U to simultaneously take photographs. Thus, the camera controller 13 functions as a simultaneous photography device for capturing two images by causing the lens 11D and the lens 11U, which are photographic lenses, to simultaneously take photographs. The two pictures representing the images that are photographed at this time form images of objects within the ranges of the horizontal angle of view 51D and the horizontal angle of view 51U shown in FIG. 2. At this time, when the portable phone device 10 is open, the optical axis 50D and the optical axis 50D form an angle 90°−θ (θ≠90°). The optical axis 50D and the optical axis 50U are separated by a distance of b [cm], and the distance expressed by b [cm] is the shortest possible distance that can separate the optical axis 50D and the optical axis 50U. Therefore, the two pictures photographed by the camera function unit 12D and the camera function unit 12U are photographed from substantially the same position, but in different directions that differ by 90°−θ.

Figure 5:
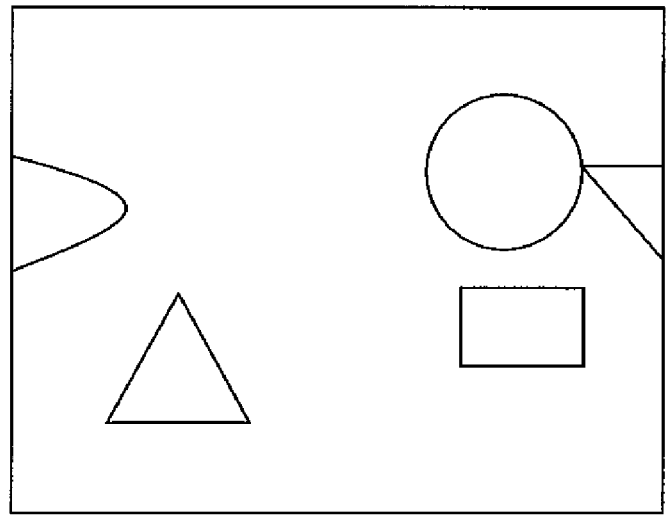
FIG. 5 is an explanatory diagram of the results of photographing with the portable phone device according to an embodiment of the present invention.
Figure 5:
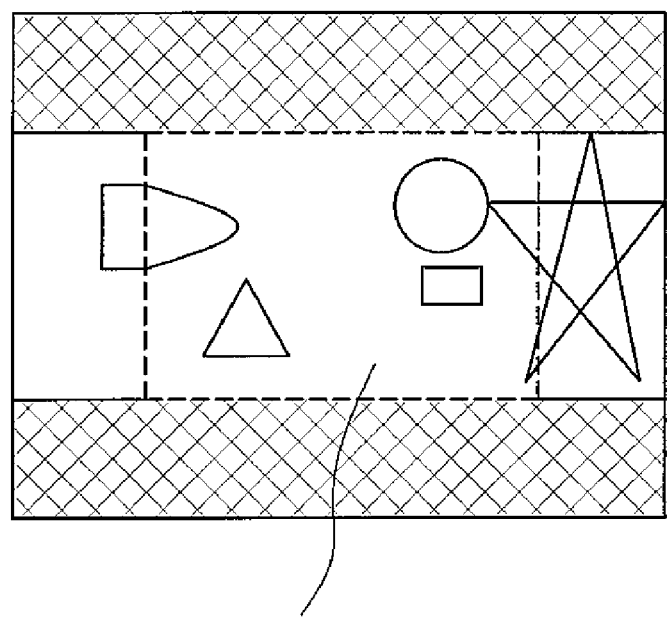

The camera controller 13 creates a panoramic photograph by combining the photographed images. An example of a panoramic photograph is shown in FIG. 5. FIG. 5(a) is an example of an image obtained by photographing in normal photography mode, and FIG. 5(b) is an example of a panoramic image obtained by photographing in panoramic photography mode. The panoramic image obtained by photographing in panoramic photography mode is horizontally wider than the image obtained by photographing in normal photography mode. In panoramic photography mode, pictures are photographed with two cameras in directions that differ by 90°−θ. Therefore, the range (horizontal angle of view range) that can be photographed with two cameras is 90°−θ greater than the range that can be photographed with one camera. However, the longitudinal angle of view is the same as in photographs with one camera. Therefore, the overlapping areas in the pictures photographed with two cameras are combined to create an image that is horizontally longer by an amount corresponding to the greater angle. In other words, when the portable phone device 10 is closed, the optical axis 50D and the optical axis 50U are pointed in slightly different directions, and the optical axis 50D and optical axis 50U are placed closer together, making it possible to photograph panoramic images.

The camera controller 13 outputs the captured panoramic image to the controller 14, the controller 14 temporarily stores the panoramic image in the storage unit 18 and outputs the image to the output unit 16, and the output unit 16 displays the panoramic image on the LCD 3. The user can then select to store the photographed panoramic image in the storage unit 18, to attach and send the photographed panoramic image with an e-mail, or to perform another action.

The process described above will now be described more specifically with reference to flowcharts of the operation of the portable phone device 10.

Figure 6:
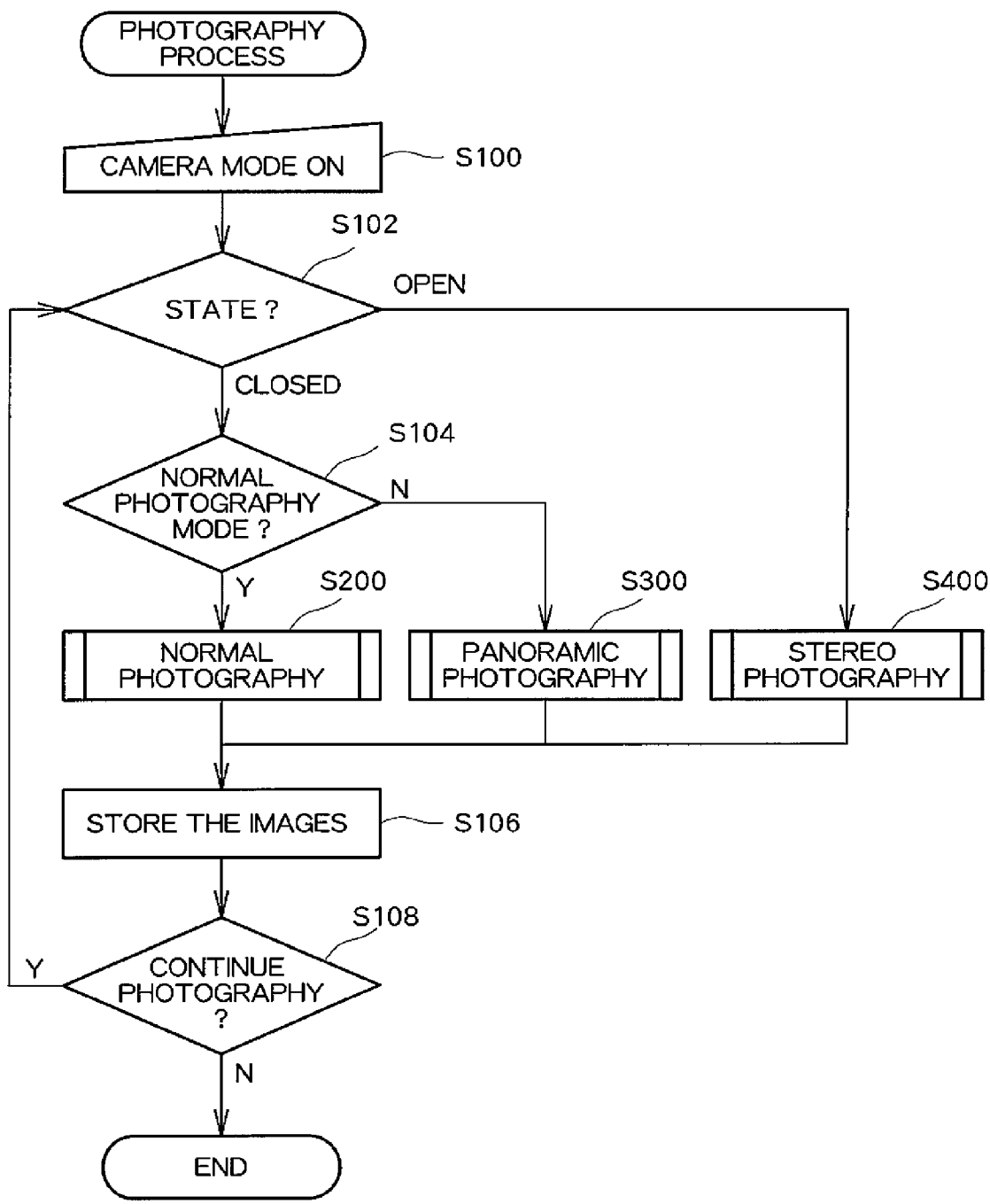
FIG. 6 is a flowchart of the operation of the portable phone device according to an embodiment of the present invention.

FIG. 6 is a process flowchart showing a flowchart of the operation of the portable phone device 10. As shown in this diagram, the user first sets the camera mode to ON by input through the input unit 15 (S100). The portable phone device 10 functions as both a portable phone and a camera device while the camera mode is ON. The controller 14 thereupon determines the state of the portable phone device 10 (S102). Specifically, the controller 14 checks the state information stored in the storage unit 18 and determines whether the state information indicates "closed," "open," or "neither" (S102). Thus, the controller 14 functions as a determination device for determining whether the portable phone device 10 is "closed," "open," or "neither." In cases in which it is determined that an "open" state is indicated, the stereo photography (S400) process is initiated. In cases in which it is determined that the state information indicates a "closed" state, the controller checks the camera mode stored in the storage unit 18. It is then determined whether the camera photography mode is the mode to "take photographs with one camera" or the mode to "take photographs with two cameras." In cases of the mode to "take photographs with one camera," normal photography mode is determined (S104), and in cases of the mode to "take photographs with two cameras," panoramic photography mode is determined (S104). Thus, the controller 14 functions as an imaging method determination device for determining, in accordance with the state of the portable phone device 10, whether a stereo image or a panoramic image will be created based on the two images; or whether or not only one image will be photographed. The controller then initiates the photography processes (S200, S300).

Either the state information or the camera mode may be checked first, but in cases in which the camera mode is checked first, normal photographs can be taken even when the portable phone device is open. In cases in which the state information is checked first, stereo photography mode can be initiated merely by detecting that the portable phone device is open. In cases in which the state information indicates "neither," it is acceptable to ensure that photographs are not taken (to limit the taking of photographs).

Figure 7:
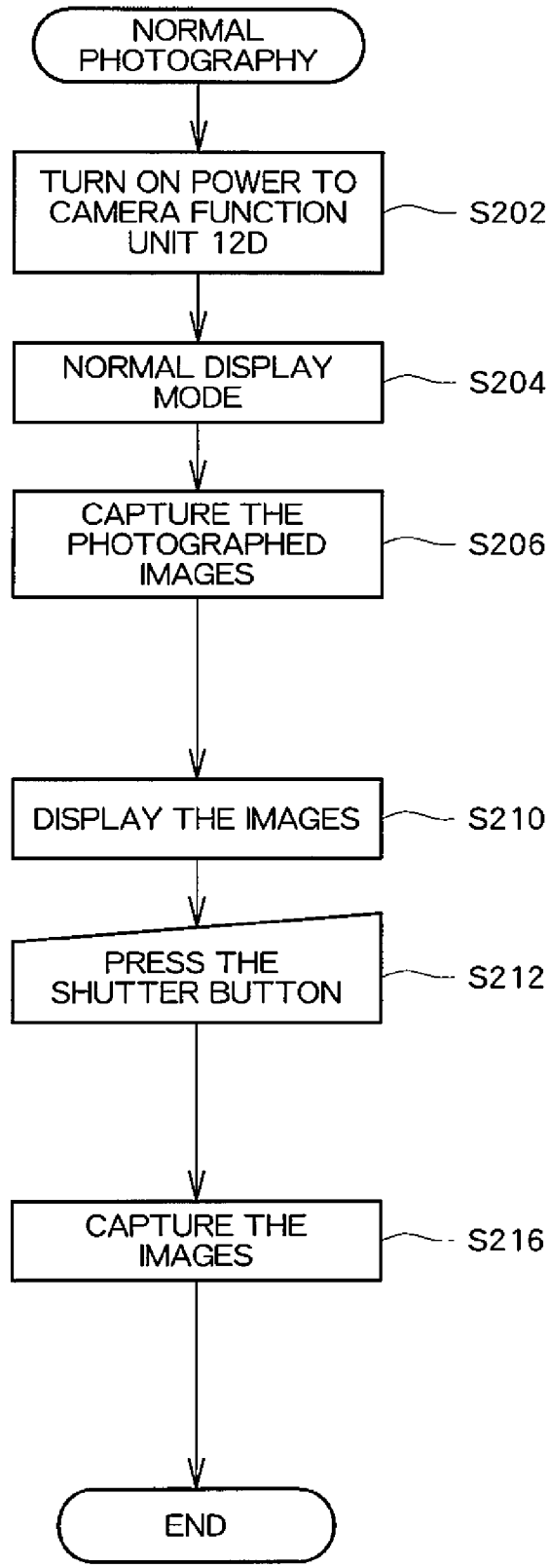
FIG. 7 is a flowchart of the operation of the portable phone device according to an embodiment of the present invention.

Normal photography mode will now be described. FIG. 7 is a flowchart of the photography process in normal photography mode. First, the controller 14 notifies the camera controller 13 that the portable phone device is in normal photography mode, and the camera controller 13 supplies power to the camera function unit 12D (S202). The controller 14 sets the images displayed on the LCD 3 to normal display mode (S204). In normal display mode, the images are displayed in full-screen, as shown in FIG. 5(*a*). The camera function unit 12D then captures the photographed images via the lens 11D (S206) and sequentially outputs the images to the camera controller 13, and the camera controller 13 furthermore sequentially outputs the images to the controller 14. The controller 14 sequentially displays the outputted images on the LCD 3 in normal display mode (S210). Thus, the photographed images captured by the camera function unit 12D are displayed in real time as a movie on the LCD 3. When the shutter button 5 is pressed (S212), a shutter depression signal indicating this action is outputted to the camera controller 13 via the input unit 15 and the controller 14. The camera controller 13 thereupon controls the camera function unit 12D to capture an image via the lens 11D (S216), and the captured image is outputted to the controller 14. The image captured by the camera function unit 12D at this time is a still image.

Figure 8:
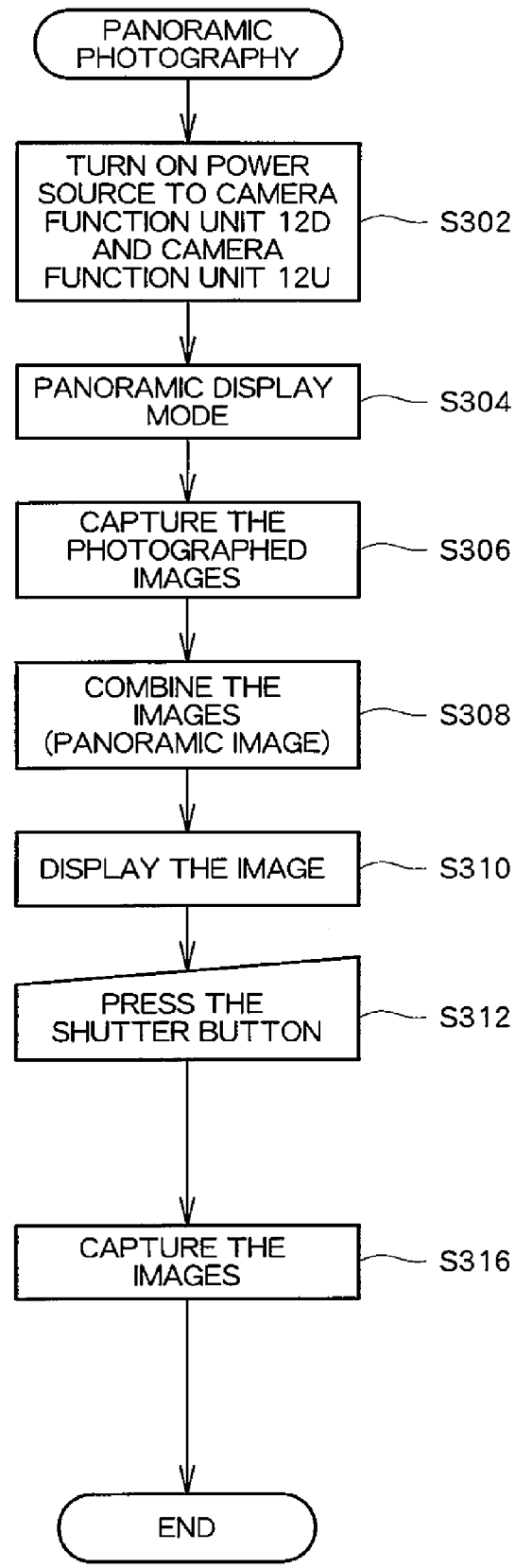
FIG. 8 is a flowchart of the operation of the portable phone device according to an embodiment of the present invention.

The following is a description of panoramic photography mode. FIG. 8 is a flowchart of the photography process in panoramic photography mode. First, the controller 14 notifies the camera controller 13 that the portable phone device is in panoramic photography mode, and the camera controller 13 supplies power to the camera function unit 12D and the camera function unit 12U (S302). The controller 14 sets the images displayed on the LCD 3 to panoramic display mode (S304). In panoramic display mode, the images are displayed in wide-screen, as shown in FIG. 5(*b*). The camera function unit 12D and the camera function unit 12U then capture the photographed images via the lens 11D (S306), the camera controller 13 combines the images captured by the camera function unit 12D and the camera function unit 12U to form panoramic images (S308), and the camera controller then sequentially outputs the images to the controller 14. The controller 14 sequentially displays the outputted panoramic images on the LCD 3 in panoramic display mode (S310). Thus, the panoramic images combined by the camera controller 13 are displayed in real time as a movie on the LCD 3. When the shutter button 5 is pressed (S312), a shutter depression signal indicating this action is outputted to the camera controller 13 via the input unit 15 and the controller 14. The camera controller 13 thereupon controls the camera function unit 12D and the camera function unit 12U so that the units capture images via the lens 11D and the lens 11U, respectively (S316); and the captured images are combined to form a panoramic image outputted to the controller 14. The combined panoramic image at this time is a still image.

Figure 9:
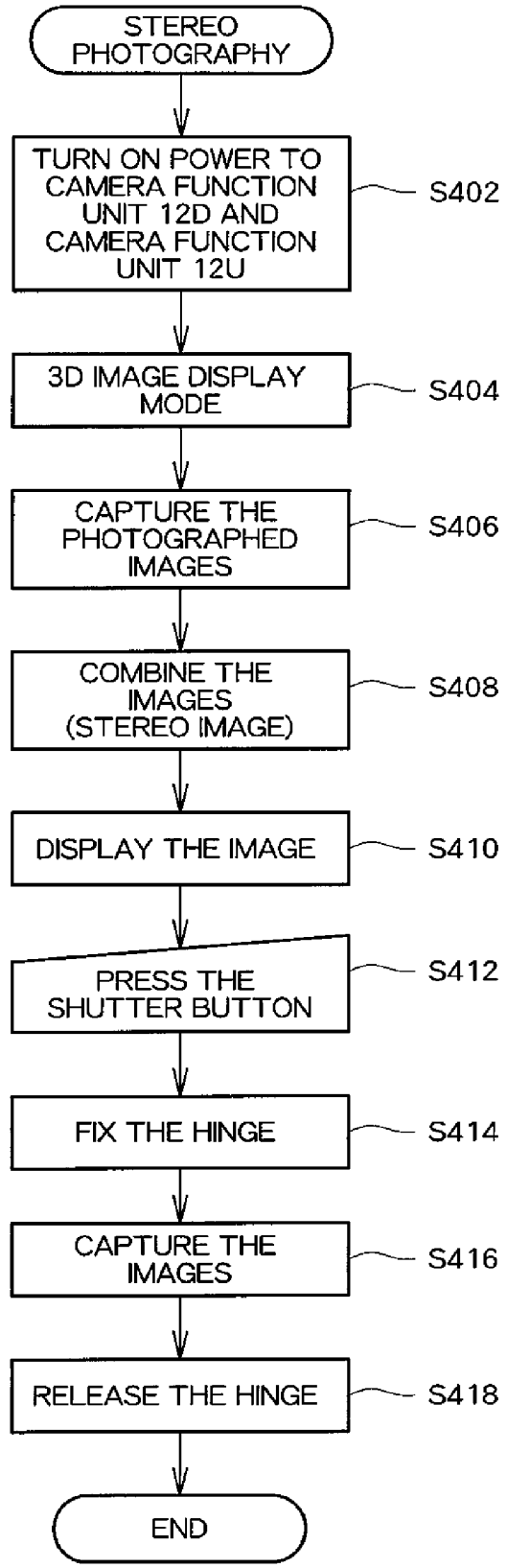
FIG. 9 is a flowchart of the operation of the portable phone device according to an embodiment of the present invention.

The following is a description of stereo photography mode. FIG. 9 is a flowchart of the photography process in stereo photography mode. First, the controller 14 notifies the camera controller 13 that [the portable phone device] is in stereo photography mode, and the camera controller 13 supplies power to the camera function unit 12D and the camera function unit 12U (S402). The controller 14 sets the images displayed on the LCD 3 to stereo display mode (S404). In stereo display mode, the LCD 3 uses, e.g., a parallax barrier to display the two stereo-photographed images as a three-dimensionally viewable image, as described above. The camera function unit 12D and the camera function unit 12U then capture the photographed images via the lens 11D (S406), and the camera controller 13 sequentially outputs the captured images to the controller 14. The controller 14 combines and captures the outputted images as stereo images (S408) and sequentially displays the images on the LCD 3 in stereo display mode (S410). The stereo images combined and captured by the controller 14 at this time are displayed in real time as a movie on the LCD 3. When the shutter button 5 is pressed (S412), a shutter depression signal indicating this action is outputted to the camera controller 13 via the input unit 15 and the controller 14. At this time, the controller 14 secures the positional relationship between the casing 1D and the casing 1U at the hinge 2 (S414).

The hinge 2 is provided with an elastic member as described above, and the elastic force of this elastic member causes the casing 1U to press against the casing 1D. However, the casings must be more firmly fastened together because when the positions of the cameras are even slightly misaligned during stereo photography, the resulting image cannot be viewed three-dimensionally. For example, and electromagnet, a support rod, or another such fastening device (not shown) can be used to provide a firmer connection. In cases in which this connection causes the reference plane/reference plane angle to change slightly, the optical axis/reference plane angle is preferably determined based on the angle after the connection is made.

Next, the camera controller 13 controls the camera function unit 12D and the camera function unit 12U so that the units capture images via the lens 11D and the lens 11U, respectively (S416); and the captured images are outputted to the controller 14. The controller 14 then combines the captured images to form a stereo image. The combined stereo image at this time is a still image. The fastening of the hinge 2 is then released (S418).

The images captured by the controller 14 as described above are kept in the storage unit 18 (S106). The controller 14 then captures the results selected by the user in the menu screen (not shown) to determine whether or not to continue photography (S108). In cases in which photography is to be continued, the controller again checks the state (S102) and performs the photography process, and in cases in which photography is not to be continued, the controller ends the photography process. At this time, the power to the camera function unit 12D and camera function unit 12U is preferably turned off.

The configurations and processes described above make it possible to separately take stereo photographs and panoramic photographs with one portable phone device 10, without enabling the photographic lenses to rotate relative to the casings provided to the camera. Specifically, since the optical axes of the photographic lenses do not move relative to the casings, and stereo photographs and panoramic photographs can be taken separately merely by opening and closing the casings, stereo photographs and panoramic photographs can easily be taken separately by opening and closing the casings without providing a mechanism for moving the optical axes of the photographic lenses relative to the casings. Also, since there is no need for a mechanism for moving the optical axes of the photographic lenses relative to the casings, the portable phone device 10 can be made smaller.

Since the two lenses are separated by a distance corresponding to the lengths of the two casings during stereo photography, and by the shortest possible distance at which the horizontal angles of view do not overlap the casings during panoramic photography, the distance between the photographic lenses can be appropriately set for both stereo photography and panoramic photography.

Furthermore, since the photography method can be determined according to the state of the portable phone device, stereo photographs and panoramic photographs can be suitably taken because it is possible to ensure that the user will not take photographs in a mode not suited to the state of the device, such as taking panoramic photographs when the device is open or taking stereo photographs when the device is closed, for example.

The above processes were described using an example of a so-called revolver-type portable phone, but a sliding-type portable phone, for example, may also be used. In the case of a sliding-type portable phone, two casings are provided, but a slider mechanism is used instead of the rotating shaft. The portable phone can be switched between a lengthened state and a shortened state by sliding one casing relative to the other casing. At this time, it is possible to separately take stereo photographs and panoramic photographs using the lenses fixed at the ends of the casings. This can be achieved by designing a configuration in which the angles formed by the angle reference planes defined by the casings are not the same in the shortened state and the lengthened state.

In cases in which auto-focusing is used as the focusing mechanism for the camera function unit 12D and the camera function unit 12U, circuits may be provided for automatically focusing on the closest object within the horizontal angle of view in stereo photography mode and panoramic photography mode. Thus, even in cases in which two cameras are used, the cameras can both be suitably focused.

The invention claimed is:

1. A camera device capable of selectively photographing panoramic images and stereo images, comprising:
    a first casing that is fixed with a first photographic lens; and
    a second casing that is fixed with a second photographic lens and that moves relative to the first casing while facing the first casing,
    wherein when the first and second casings are disposed in open positions by relative movement of the second casing, optical axes of the first and second photographic lenses are placed in positions capable of photographing the stereo images,
    when the first and second casings are disposed in closed positions by relative movement of the second casing, the optical axes of the first and second photographic lenses are placed in positions capable of photographing the panoramic images,
    wherein the second casing overlaps the first casing in the closed positions.

2. The camera device of claim 1, wherein an included angle formed by the optical axes of the first and second photographic lenses in the closed positions is substantially equal to an included angle formed by normal lines of the first and second casings in the open positions.

3. The camera device of claim 1, wherein the second casing is configured so that an area that moves relative to the first casing does not overlap an area of an angle of view determined by the optical axis of the first photographic lens.

4. The camera device of claim 1, wherein
    when the first and second casings are disposed in the open positions, stereo images are created based on images photographed using both the first and second photographic lenses; and
    when the first and second casings are disposed in the closed positions, panoramic images are created based on images photographed using both the first and second photographic lenses.

* * * * *